Figure 1:
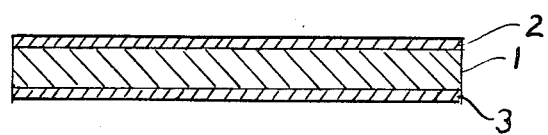

United States Patent [19]

Kunze

[11] 3,798,067

[45] Mar. 19, 1974

[54] ELECTROLYTIC CELL AND METHOD FOR MAKING SAME

[75] Inventor: Dieter Kunze, Kelkheim, Germany

[73] Assignee: Varta Aktiengesellschaft, Kelkheim/Ts., Germany

[22] Filed: Oct. 17, 1972

[21] Appl. No.: 298,258

[30] Foreign Application Priority Data
Oct. 18, 1971 Germany............................ 2151736
Oct. 18, 1971 Germany............................ 2151734

[52] U.S. Cl.............. 136/6 LN, 136/83 R, 136/153
[51] Int. Cl. .......................................... H01m 35/00
[58] Field of Search ................. 136/6, 83, 153, 155

[56] References Cited
UNITED STATES PATENTS

| 3,701,686 | 10/1972 | Argue et al. ...................... 136/83 |
| 3,663,299 | 5/1972 | Owens et al. ...................... 136/83 R |
| 3,661,647 | 5/1972 | Owens et al. ...................... 136/83 R |
| 3,558,357 | 1/1971 | Pokashaski ...................... 136/153 X |

Primary Examiner—A. B. Curtis
Assistant Examiner—C. F. Lefevour
Attorney, Agent, or Firm—Herbert L. Lerner

[57] ABSTRACT

An electrolytic or galvanic cell has at least one electrode having silver as an active substance and a solid electrolyte essentially consisting of silver iodide and silver selenate. In making the cell, the electrolyte is pressed into a tablet, a mixture of silver and electrolyte powder is pressed onto one side of the tablet and a mixture containing graphite and electrolyte powder is pressed onto the other side of the tablet.

10 Claims, 2 Drawing Figures

ELECTROLYTIC CELL AND METHOD FOR MAKING SAME

SPECIFICATION

The invention relates to a galvanic cell or an electrolytic cell, such as a control cell, and, more particularly, to an electrolytic or galvanic cell in which at least one electrode has silver as an active substance, and which has a solid electrolyte.

Electrolytic cells of this general type, which function as control cells for long periods of operation or which function as coulometers to measure quantities of current, have been known heretofore. In these known cells, a given amount of metal such as silver or copper, for example, is transferred through electrolysis from one electrode to the other. If the current strength is kept constant, the period of time for transferring the total amount of metal can then be determined and the subsequent jump in voltage can be employed for releasing certain operations, producing signals or carrying out switching processes. When used as a coulometer or a current quantity integrator, a quantity of metal that corresponds to the product of current intensity and time is transferred from a supply electrode to the opposite electrode. From the time it takes to return the quantity of metal, at constant current intensity, the amount of current can be determined. In this manner, the operational life or durability of electrical appliances can be established, for example. Electrolytic cells of this type may comprise aqueous electrolytes, organic electrolytes or solid electrolytes. Compounds containing silver-halogenide, for example $RbAg_4I_5$, are known and have become popular for use as solid electrolytes.

By using solid electrolytes, the production of cells containing exclusively solid components, is afforded. The advantage of such cells is that they possess good mechanical and chemical stability, have a broad temperature operating range, and a long life span or durability, and are relatively simply adaptable for miniaturization. The primary characteristics of a solid electrolyte are high ion conductivity, low electron conductivity, and chemical stability. The heretofore known solid electrolyte $RbAg_4I_5$ possesses a relatively high ion conductivity, but is unstable in the presence of moisture. Another disadvantage of this electrolyte is its high material-cost.

Accordingly, it is an object of the present invention to provide an electrolytic or galvanic cell which operates accurately and reliably.

A further object is to provide a cell with a solid electrolyte having a high silver-ion conductivity which can be discharged with relatively high current densities.

Another object of the invention is to provide a relatively simple, inexpensive and easy-to-practice method of producing such a cell.

With the foregoing and other objects in view, there is provided in accordance with the invention, a cell having a solid electrolyte which consists essentially of silver iodide and silver selenate. This electrolyte is stable with respect to moisture and more economical than $RbAg_4I_5$. It has a silver ion conductivity of about $10^{-3}$ $(Ohm \cdot cm)^{-1}$.

In accordance with a further feature of the invention, the electrolyte consists essentially of 60 to 80 Mol percent AgI and 20 to 40 Mol percent $Ag_2SeO_4$.

In accordance with a more specific feature of the invention which affords particularly good results, the electrolyte consists essentially of substantially 70 Mol percent AgI and substantially 30 Mol percent $Ag_2SeO_4$.

In the electrolytic cell of the invention, one electrode has silver as an active component thereof, while the other electrode is an inert electrode.

In accordance with an added feature of the invention, the inert electrode consists essentially of a mixture of electrolyte and graphite, but may also include a chemically resistant metal, such as gold or platinum. In the galvanic cell of the invention, there is provided a positive electrode consisting essentially of a mixture of graphite and iodine or a mixture of graphite, an iodine yielding substance, such as $RbI_3$, for example, and electrolyte.

The electrolytic cell according to the invention may be easily and readily produced by the method of the invention which comprises mixing the components of the electrolyte, melting and thereafter cooling the mixture and, after solidification thereof, pulverizing it and then compressing it into tablets, thereafter pressing onto one side of the electrolyte tablet a mixture of silver and electrolyte powder with or without graphite, and onto the other side, a mixture of graphite and electrolyte powder.

The galvanic cell according to the invention, is produced by the method of the invention which comprises pressing onto one side of the electrolyte tablet a mixture of silver and electrolyte powder, for example at a ratio of 1:1 by weight, and onto the other side thereof, a mixture of graphite, iodine, and electrolyte at a ratio by weight of 2:2:1.

An exemplary embodiment of the galvanic cell of the invention had a diameter of 20 mm and a thickness of 4 mm, the cell resistance being about 200 Ohm, and the equilibrium potential about 680mV. At a constant discharge current of approximately 200 $\mu$A, the cell delivered a voltage of about 450 – 550 mV.

Other features which are considered as characteristic for the invention are set forth in the appended claims.

Although the invention is illustrated and described herein as electrolytic or galvanic cell and method of making the same, it is nevertheless not intended to be limited to the details shown, since various modifications may be made therein without departing from the spirit of the invention and within the scope and range of equivalents of the claims.

Figure 2:
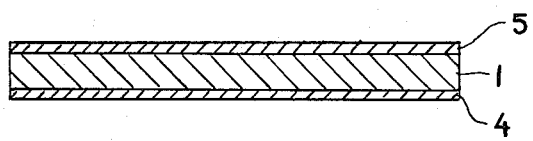

The invention, however, together with additional objects and advantages thereof, will be best understood from the following description when read in connection with the accompanying drawing in which:

FIG. 1 is a diagrammtic sectional view of an electrolytic cell constructed in accordance with the invention; and FIG. 2 is a similar view of a galvanic cell.

Referring to the drawing, there is shown in FIG. 1 an electrolytic cell having a solid electrolyte 1 formed of a mixture of AgI and $Ag_2SeO_4$. Also included in the electrolytic cell of FIG. 1 is an electrode 2 having silver as an active component thereof, and an electrode 3 formed of inert material such as a mixture of electrolyte and graphite or of a chemically resistant metal such as gold or platinum.

In FIG. 2, the galvanic cell has a solid electrolyte 1 as in the electrolyte cell of FIG. 1, however, the positive electrode 4 thereof is formed of a mixture of graphite and iodine or of a mixture of graphite, as iodine yielding substance such as $RbI_3$, and electrolyte. The negative electrode 5 of the galvanic cell has silver as an active substance thereof.

I claim:

1. In an electric cell, the combination comprising an electrode having silver as an active substance, and a solid electrolyte, said solid electrolyte consisting essentially of silver iodide and silver selenate.

2. An electric cell as claimed in claim 1, wherein said solid electrolyte contains about 60 to 80 Mol percent AgI and about 20 to 40 Mol percent $Ag_2SeO_4$.

3. An electric cell as claimed in claim 1 wherein said electrolyte is a mixture of about 70 Mol percent AgI and about 30 Mol percent $Ag_2SeO_4$.

4. An electric cell as claimed in claim 1 wherein said electrode is a negative electrode and further comprising an inert positive electrode.

5. An electric cell as claimed in claim 4 wherein the cell is a galvanic cell, and said inert electrode consists essentially of a mixture of graphite, an iodine-yielding substance, and the solid electrolyte.

6. A galvanic cell as claimed in claim 5 wherein said inert electrode consists essentially of a mixture of graphite, $RbI_3$ and the solid electrolyte.

7. Method of producing an electric cell as claimed in claim 1 comprising the steps of mixing the components of an electrolyte consisting essentially of silver iodine and silver selenate, melting said mixture, cooling said micture whereby said mixture is solidified, pulverizing said mixture, pressing said mixture into tablets, pressing a mixture of silver and electrolyte powder onto one side of said tablets, and pressing a mixture of graphite and electrolyte powder onto the other side of said tablet.

8. Method according to claim 7 wherein graphite is included with the mixture of silver and electrolytic powder which is pressed onto said one side of said tablet.

9. Method according to claim 7 wherein the cell is a galvanic cell, which further comprises mixing an iodine-yielding substance with the mixture of graphite and electrolyte powder.

10. Method according to claim 7 wherein the cell is a galvanic cell, which further comprises mixing iodine with the graphite and electrolyte powder.

* * * * *